US010416520B2

(12) United States Patent
Jovanovic

(10) Patent No.: US 10,416,520 B2
(45) Date of Patent: Sep. 17, 2019

(54) DISPLAY WITH ADJUSTABLE TRANSPARENCY

(71) Applicant: HEWLETT-PACKARD DEVELOPMENT COMPANY, L.P., Houston, TX (US)

(72) Inventor: Milorad Jovanovic, Belgrade (YU)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/535,873

(22) PCT Filed: Mar. 20, 2015

(86) PCT No.: PCT/US2015/021807
§ 371 (c)(1),
(2) Date: Jun. 14, 2017

(87) PCT Pub. No.: WO2016/153467
PCT Pub. Date: Sep. 29, 2016

(65) Prior Publication Data
US 2018/0004059 A1 Jan. 4, 2018

(51) Int. Cl.
G09G 3/32 (2016.01)
G09G 5/00 (2006.01)
G06F 3/14 (2006.01)
G02F 1/163 (2006.01)
(Continued)

(52) U.S. Cl.
CPC .............. *G02F 1/163* (2013.01); *G06F 3/147* (2013.01); *G09G 3/3208* (2013.01); *G09G 5/003* (2013.01); G09G 2320/0261 (2013.01); G09G 2320/08 (2013.01); G09G 2340/04 (2013.01); G09G 2354/00 (2013.01)

(58) Field of Classification Search
USPC ........................................................ 345/592
See application file for complete search history.

(56) References Cited

U.S. PATENT DOCUMENTS

2009/0031237 A1* 1/2009 Jessen ................... G06F 3/0481
715/768
2010/0220280 A1* 9/2010 Hyytiainen ........... G02F 1/1347
349/193
2013/0271378 A1 10/2013 Hulford
(Continued)

FOREIGN PATENT DOCUMENTS

JP 2011-059589 A 3/2011
KR 10-2012-0032659 A 4/2012
(Continued)

OTHER PUBLICATIONS

"Review Lenovo ThinkPad Twist Convertible Ultrabook"; Dec. 12, 2012; 10 pages.

Primary Examiner — Wesner Sajous
(74) Attorney, Agent, or Firm — HPI Patent Department

(57) ABSTRACT

An example disclosed herein determines a setting to present a presentation on a transparent display layer of a display, adjusts a transparency of a first adjustable transparency layer of the display based on the first setting to present the presentation through the first adjustable transparency layer, and adjusts a transparency of a second adjustable transparency layer of the display based on the first setting to prevent the presentation from being presented through the second adjustable transparency layer.

15 Claims, 9 Drawing Sheets

(51) Int. Cl.
  *G06F 3/147* (2006.01)
  *G09G 3/3208* (2016.01)

(56) References Cited

U.S. PATENT DOCUMENTS

| | | | |
|---|---|---|---|
| 2014/0035942 A1* | 2/2014 | Yun | G09G 5/006 |
| | | | 345/592 |
| 2014/0183342 A1* | 7/2014 | Shedletsky | G06F 1/1637 |
| | | | 250/215 |
| 2015/0062175 A1 | 3/2015 | Kim | |
| 2015/0177514 A1* | 6/2015 | Maimone | G02B 27/0101 |
| | | | 345/8 |
| 2015/0185782 A1* | 7/2015 | Kim | G06F 1/1652 |
| | | | 349/12 |
| 2017/0310956 A1* | 10/2017 | Perdices-Gonzalez | |
| | | | H04N 13/366 |

FOREIGN PATENT DOCUMENTS

| | | |
|---|---|---|
| KR | 10-2013-0113902 A | 10/2013 |
| KR | 10-2014-0043522 A | 4/2014 |
| WO | WO-2014101098 | 7/2014 |
| WO | WO-2014105182 | 7/2014 |
| WO | WO-2014110567 | 7/2014 |

\* cited by examiner

DISPLAY WITH ADJUSTABLE TRANSPARENCY

BACKGROUND

Displays may present information and media to users of electronic devices or other equipment. In many instances, displays use an array of pixels such as liquid crystals (e.g., a liquid crystal display (LCD)), light emitting diodes (e.g., a light emitting diode (LED) display), organic LEDs, etc. and a light source.

Figure 1A:
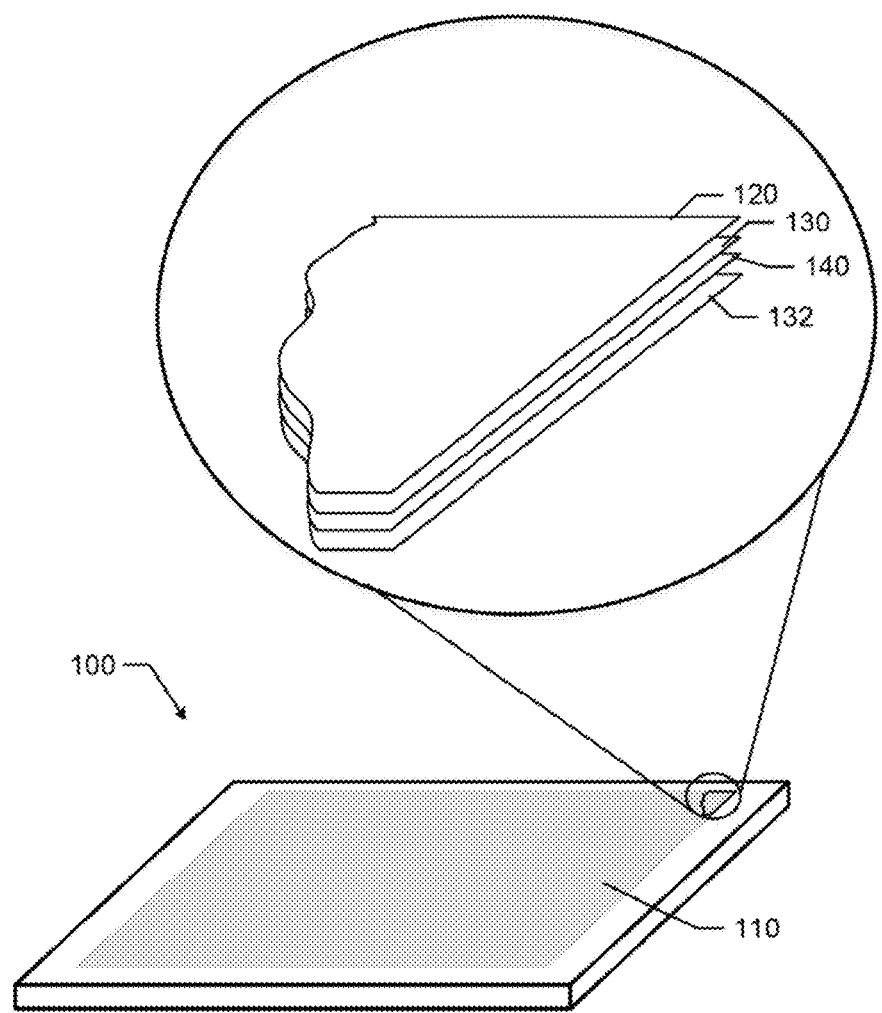
FIGS. 1A and 1B are isometric illustrations of example transparent display devices including example transparent displays constructed in accordance with the teachings of this disclosure with cross-sectional views of portions of the respective example transparent displays.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with at least one intermediate part located therebetween. Stating that any part is in contact with another part means that there is no intermediate part between the two parts.

DETAILED DESCRIPTION

Examples disclosed herein involve a transparent display. An example transparent display disclosed herein may include a transparent display layer and adjustable transparency layers to enable the transparent display to be viewed from a first side, a second side opposite the first side, or both the first and second sides of the transparent display based on settings of the transparent display. Determining settings of the transparent display may be based on a plurality of factors or characteristics including user input, user location, display position, etc.

In examples disclosed herein, a transparent display may be adaptable for various uses. For example, the transparent display may be used to convert a laptop device to a tablet device. In another example, the transparent display may be used to display information on one side or another side of a wall. In examples disclosed herein, using multiple adjustable transparency layers allows for enhanced clarity of a presentation presented by a transparent display. Furthermore, using examples disclosed herein involving a transparent display provide for a thinner profile display over previous techniques, such as using multiple displays in a back-to-back orientation.

An example transparent display includes a first adjustable transparency layer and a second adjustable transparency layer. The first adjustable transparency layer may be set to be transparent based on a first setting of the display, and the second transparency layer set to be opaque based on the first setting of the display. The transparent display may include transparent display layer between the first adjustable transparency layer and the second adjustable transparency layer, and a display controller to render a presentation on the transparent display layer to be viewable through the first transparency layer using the first setting.

An example method includes determining a first setting to present a presentation on a transparent display layer of a display, adjusting a transparency of a first adjustable transparency layer of the display based on the first setting to enable viewing of the presentation through the first adjustable transparency layer, and adjusting a transparency of a second adjustable transparency layer of the display based on the first setting to disable viewing of the presentation through the second adjustable transparency layer.

As used herein, a transparency of a layer refers to a degree of light that may pass through the layer (e.g., from 100% transparent to opaque (or 0% transparent)). As used herein, a layer is transparent when a threshold percentage of light (e.g., 80%, 90%, 100%) may pass through the layer. For example, a layer is transparent when a human viewer can reasonably see through the layer or see objects through a layer (e.g., similar to a user being able to look through a window of a wall). As used herein, an opacity of a layer may refer to a degree of light that may not pass through the layer (e.g., from 100% opaque to transparent (or 0% opaque)). As used herein, a layer is opaque when no light or less than a threshold percentage of light (e.g., 1%, 5%, etc.) can pass through the layer. In other words, a layer is opaque when a human viewer cannot reasonably see through the layer (e.g., similar to a user not being able to see through a privacy wall). A layer may be a display, a layer of the display, a surface of a display, etc.

FIG. 1A illustrates an example display device 100 including an exploded view of an example transparent display 110 constructed in accordance with the teachings of this disclosure. In examples disclosed herein, the transparent display 110 may be adjusted between transparent settings or opaque settings based on settings or characteristics of the display device 100. The example transparent display device 100 may be a monitor, such as a laptop computer monitor, a wall mounted monitor, a desktop monitor, a tablet monitor, or any other type of monitor. Accordingly, the transparent display device 100 of FIG. 1A may be used to connect to a computing device (e.g., a desktop computer, a laptop computer, a tablet computer, a set top box, a digital video recorder, a receiver, a game console, etc.) to display a presentation (e.g., information, text, documents, media (e.g., video, games, images), etc.) controlled by the computing device. When referring to the example of FIG. 1A, a front-side of the transparent display device 100 refers to a same side of the transparent display device 100 as a touch-screen layer 120 (the side shown in FIG. 1A) and a back-side of the transparent display device 100 refers to the side of the transparent display device 100 opposite the touchscreen layer 120 (the side not shown in FIG. 1A).

The example transparent display 110 of FIG. 1A includes a touch screen layer 120, a first adjustable transparency layer 130, a second adjustable transparency layer 132, and a transparent display layer 140. The example touch screen layer 120 may be implemented by any suitable touch screen technique. The touch screen layer 120 may facilitate user interaction or control of the transparent display device 100 or a computer in communication with the transparent display device 100. Accordingly, the touch screen layer 120 may serve as a user interface (e.g., the input device(s) 822 of FIG. 8). In examples disclosed herein, viewing of a presentation on the transparent display may be enabled on the front-side or the back-side of the transparent display 110 by allowing light emitted from the transparent display layer 140 to pass through the first or second adjustable transparency layers 130, 132 (e.g., by setting the first or second adjustable display layers 130, 132 to a transparent setting) such that the presentation is presented through the front-side or the back-side of the transparent display 110, respectively. Conversely, viewing of a presentation may be disabled on the front-side or the back-side of the transparent display 110 by preventing light emitted from the transparent display layer 140 to pass through the first or second adjustable transparency layers 130, 132, respectively (e.g., by setting the first or second adjustable display layers 130, 132 to an opaque setting) such that the presentation is prevented from being presented through the first or second adjustable transparency layers 130, 132, respectively.

The first and second adjustable transparency layers 130, 132 of FIG. 1A may be implemented in a transparent display by a suspended particle device (e.g., Smart Glass™), an electrochromic device, or any other type of transparency controlling technology. Accordingly, the transparent display 110 may adjust the transparency of the first and second adjustable transparency layers 130, 132 may adjust transparency (or opacity) by applying a voltage or electrical charge to the devices. In some examples, the transparent display 110 may control a degree of transparency of the first and second adjustable transparency layers 130, 132 or characteristics (e.g., color, reflectiveness, etc.) of the first and second adjustable transparency layers 130, 132.

The example transparent display layer 140 of FIG. 1A includes a plurality of transparent pixels (e.g., transparent organic light emitting diodes (OLEDs)). The example transparent pixels may include transparent components (e.g., substrate, cathode, anode, etc.) that are transparent when powered off and emit light when powered on. Accordingly, when the transparent pixels are powered on, a user may see or view the light emitted from the transparent pixels from the front-side of the transparent display 110 or the back-side of the transparent display 110, and the user may see through the transparent display pixels that are powered off. In examples disclosed herein, the transparent display layer 140 may include an array of transparent OLEDs. Accordingly, when the transparent display layer 140 is presenting a presentation, it may be viewed from either the front-side of the transparent display device 100 or the back-side of the transparent display device 100. In examples disclosed herein, the first and second adjustable transparency layers 130, 132 are used to control which side of the transparent display layer 140 may be used to present a presentation of the transparent display layer 140 and thus used to control from which side of the transparent display layer 140 the presentation may be viewed. For example, the first adjustable transparency layer 130 may be transparent and the second adjustable transparency layer 132 may be opaque such that a user may view a presentation of the transparent display layer 140 through the touchscreen 120 and the first adjustable transparency layer 130.

In some examples, the transparent display 110 may include fewer or additional layers than the layers illustrated in FIG. 1A. For example, the transparent display 110 may not include the touchscreen layer 120 or may include an additional touchscreen layer situated on the second adjustable transparency layer 132 opposite the transparent display layer 140. In the illustrated example of FIG. 1B, a second transparent displayer layer 142 (similar to the transparent display layer 140) and a third adjustable transparency layer 136 (similar to the first and second adjustable transparency layers 130, 132) may be included on the second adjustable transparency layer 132. In such an example, the transparent display 140 may present a same or different presentation on the multiple transparent display layers 140, 142 that may be viewable on either side of the transparent display (e.g., with the second adjustable transparency layer 132 being set to opaque). Furthermore, the transparent display 110 or transparent display device 100 may include a transparent display controller, such as the transparent display controller 200 of FIG. 2.

Figure 1B:
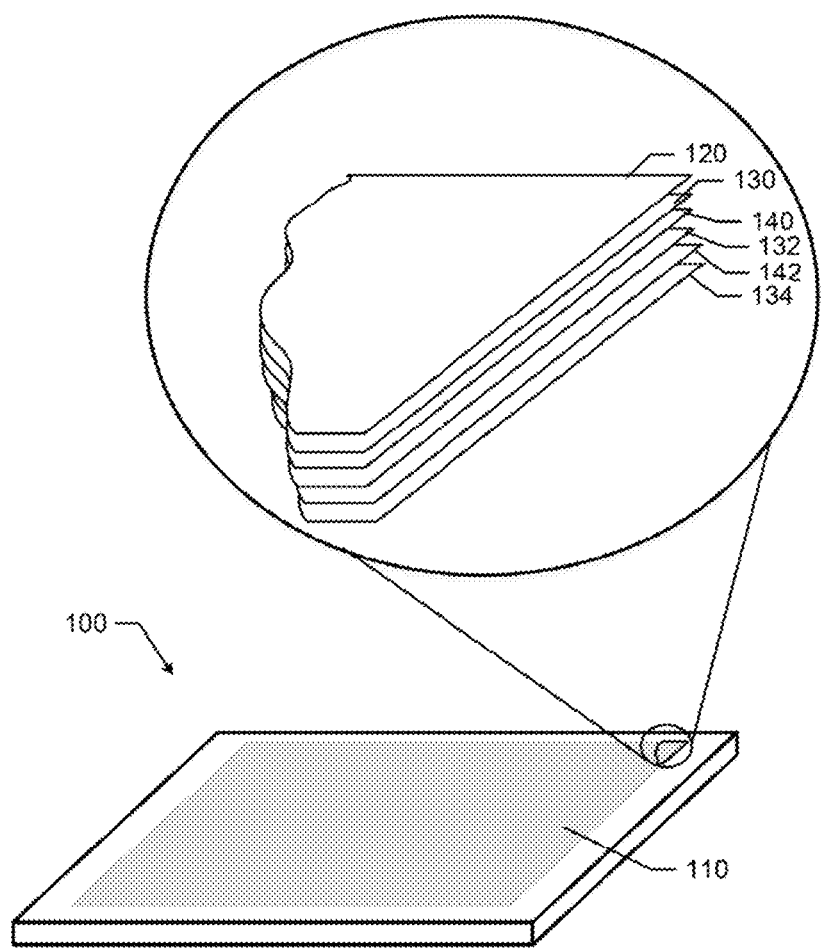
Figure 2:
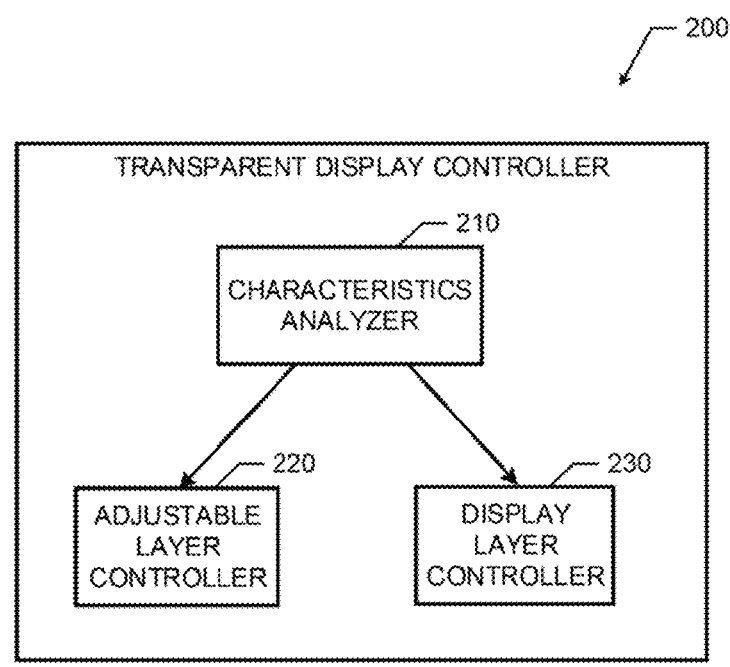
FIG. 2 a block diagram of an example transparent display controller that may be implemented by the transparent display device of FIG. 1A.

FIG. 2 is a block diagram of an example transparent display controller 200 that may be implemented by the transparent display device 100 or the transparent display 110 of FIG. 1A or 1B. The example transparent display controller 200 includes a characteristics analyzer 210, an adjustable layer controller 220, and a display layer controller 230. In examples disclosed herein, the characteristics analyzer 210 may determine desired settings or characteristics of the transparent display 110 or the transparent display device 100 and provide information or instructions to the adjustable layer controller 220 and display layer controller 230 to display a presentation on the transparent display 110.

The example characteristics analyzer 210 may analyze a variety of settings or characteristics of the transparent display device 100 or the transparent display 110. In some examples, the characteristics analyzer 210 may determine user settings for displaying a presentation on the transparent display 110. For example, a user may configure how the transparent display 110 is to present a presentation on the transparent display. Based on the user settings, the characteristics analyzer 210 may determine characteristics of the transparent display device 100 or characteristics of an environment of the transparent display device 100. Example implementations and analysis performed by the characteristics analyzer are further discussed in connection with FIGS. 3 and 4.

The example characteristics analyzer 210 of FIG. 2 provides characteristics information to the adjustable layer controller 220 and the display layer controller 230 to display a presentation on the transparent display 110. In examples disclosed herein, the adjustable layer controller 220 may adjust a transparency (or opacity) of the first and second adjustable transparent display layers 130, 132 based on the characteristics information. For example, if a presentation is to be viewed on a front-side of the transparent display 110 of FIG. 1A, the adjustable layer controller 220 may cause the first adjustable transparency layer 130 to be transparent (e.g., by disconnecting a voltage applied to the layer) and cause the second adjustable transparency layer 132 to be opaque (or vice versa for viewing on the back-side). Accordingly, in such an example, a user is able to view the transparent display layer 140 through the first adjustable transparency layer 130 (i.e., the user can see light emitted from pixels of the transparent display layer 140) and the second adjustable transparency layer 132 may serve as a background or backdrop of the presentation (e.g., to enhance clarity or picture of the presentation). In some examples, the adjustable layer controller 220 may cause both the first and second adjustable transparency layers 130, 132 to be transparent or opaque, respectively. In some examples, the adjustable layer controller 220 may control characteristics of the transparency (e.g., degree, color, etc.) or the opacity (e.g., color, reflectiveness, etc.).

The display layer controller 230 of FIG. 2 determines presentation settings for a presentation presented on the transparent display 110. In examples disclosed herein, the display layer controller 230 controls the transparent display layer 140 to present a presentation based on the characteristics information received from the characteristics analyzer 210. The display layer controller 230 controls the transparent display layer 140 such that the presentation is recognizable to a user in a proper or expected orientation (e.g., the presentation is not backwards or upside-down). For example, if a user is to view a presentation from the front-side of the transparent display 110 (with the first adjustable transparency layer 130 transparent and the second adjustable transparency layer 132 opaque) the presentation is to be presented on the transparent display layer 140 such that the presentation is presented to the front-side through the first adjustable transparency layer 130 (i.e., so a user can see the light emitted from pixels of the transparent display layer 140 from the front-side). In such an example, if the display layer controller 230 presented the information on the transparent displayer layer 140 to be viewed from the back-side of the transparent display 110, the presentation may appear backwards to the user and thus, be improperly presented. Accordingly, in examples disclosed herein, a presentation to be viewed from the front-side of the transparent display 110 may be a reversed (e.g., flipped along a central vertical axis of the transparent display 110) or inversed (e.g., flipped along a central horizontal axis of the transparent display 110) when viewed from the back-side of the transparent display 110. In some examples, the display layer controller 230 may present the presentation based on the transparency of the first adjustable transparency layer 130 and the transparency of the second adjustable transparency layer 132.

While an example manner of implementing the transparent display controller 200 is illustrated in FIG. 2, at least one of the elements, processes or devices illustrated in FIG. 2 may be combined, divided, re-arranged, omitted, or implemented in any other way. Further, the characteristics analyzer 210, the adjustable layer controller 220, the display layer controller 230 or, more generally, the example transparent display controller 200 of FIG. 2 may be implemented by hardware or any combination of hardware and executable instructions (e.g., software or firmware). Thus, for example, any of the characteristics analyzer 210, the adjustable layer controller 220, the display layer controller 230 or, more generally, the transparent display controller 200, may be implemented by at least one of an analog or digital circuit, a logic circuit, a programmable processor, an application specific integrated circuit (ASIC), a programmable logic device (PLD) or a field programmable logic device (FPLD). When reading any of the apparatus or system claims of this disclosure to cover a software or firmware implementation, at least one of the characteristics analyzer 210, the adjustable layer controller 220, and the display layer controller 230 is/are hereby expressly defined to include a non-transitory machine readable storage medium, such as a storage device, a storage disk, a memory, a digital versatile disk (DVD), a compact disk (CD), a Blu-ray disk, etc. storing the executable instructions. Further still, the example transparent display controller 200 of FIG. 2 may include at least one element, process, or device in addition to, or instead of, those illustrated in FIG. 2, or may include more than one of any or all of the illustrated elements, processes and devices.

Figure 3:
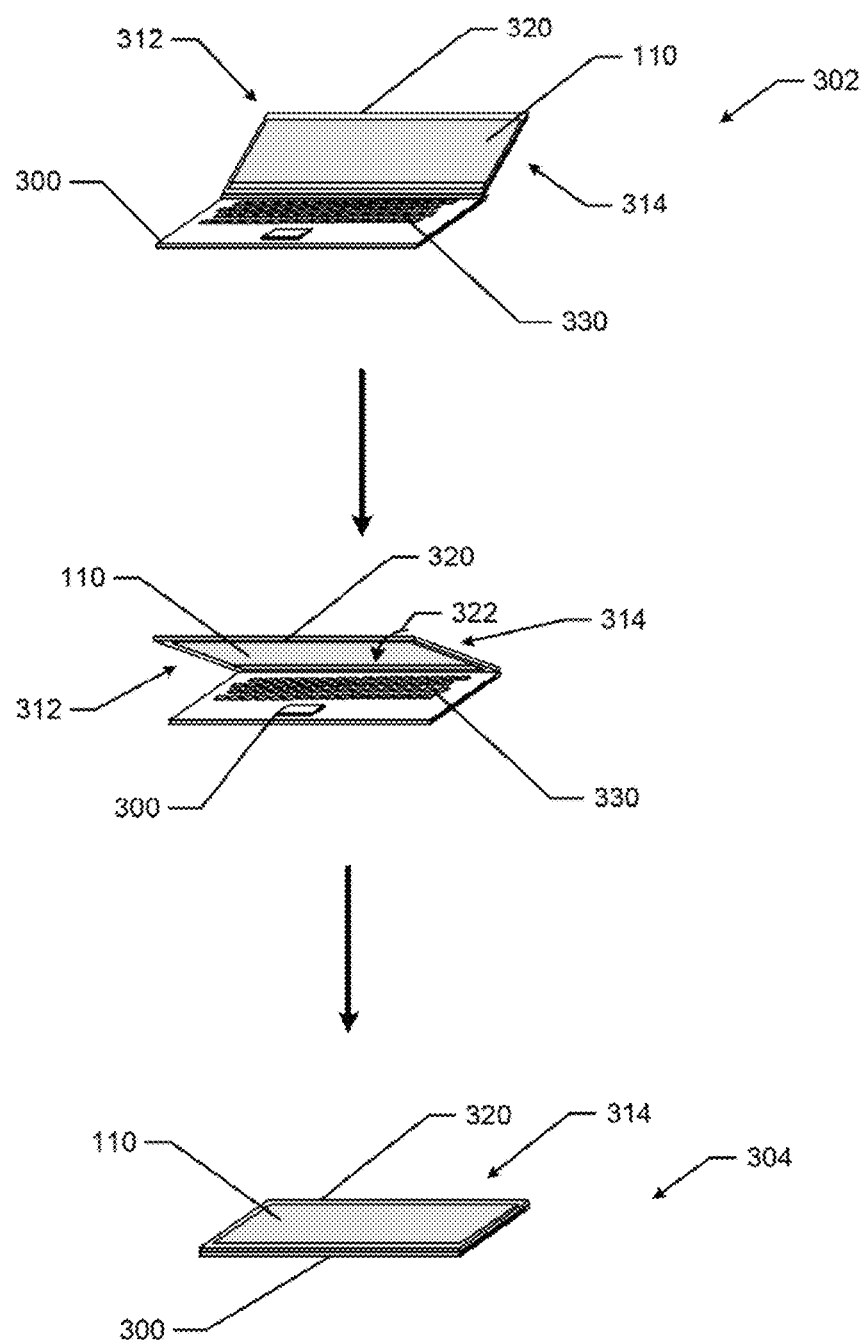
FIG. 3 illustrates an example implementation of use of the example transparent display of FIG. 1A or 1B on a computing device.

FIG. 3 illustrates an example implementation of use of the example transparent display 110 of FIG. 1A on a computing device 300. The illustrated example of FIG. 3 shows that the transparent display 110 allows the computing device 300 to convert from a laptop configuration 302 to a tablet configuration 304. The example transparent display 110 or computing device 300 may implement a transparent display controller, such as the transparent display controller 200 of FIG. 2.

In the illustrated example of FIG. 3, when the computing device 300 is in the laptop configuration 302, a first side 312 (e.g., a front-side or a laptop side) of the transparent display 110 presents a presentation to a user using the computing device 300. Accordingly, in FIG. 3, the characteristics analyzer 210 may determine that characteristics of the computing device 300 indicate that the computing device 300 is in the laptop configuration 302. For example, the characteristics analyzer 210 may determine that a lid 320 that houses the transparent display 110 is in an open position. In some examples, the characteristics analyzer 210 may determine the presence of a user on the first side 312 of the transparent display 110 (e.g. using a camera of the computing device, an image processor, facial recognition, etc.) that indicate that the computing device 300 is in the laptop configuration 302. In some examples, the characteristics analyzer 210 may determine that the lid 320 is being shut (e.g., as indicated by an arrow 322) or that it has been shut to convert the computing device 300 to the tablet configuration 304. In such examples, the adjustable layer controller 220 or the display controller 230 may change settings (e.g., transparencies of the first and second adjustable transparency layers 130, 132 or presentation orientation of the transparent display layer 140) of the transparent display 110 at a particular angle (e.g., 45 degrees, 15 degrees, etc.) of the lid 320 relative to a user input surface 330 (e.g., a keyboard or trackpad surface) or other surface of the computing device 300.

When the example computing device 300 is in the tablet configuration 304, the second side 314 (e.g., the back-side or tablet side) of the transparent display 110 presents a presentation to a user using the computing device 300. Accordingly, in FIG. 3, the characteristics analyzer 210 may determine that characteristics of the computing device 300 indicate that the computing device 300 is in the tablet configuration 304. For example, the characteristics analyzer 210 may determine that the lid 320 of the computing device 300 is in a closed position. In some examples, the characteristics analyzer 210 may determine the presence of a user on the second side 312 of the transparent display 110 that indicates that the computing device is in the tablet configuration 302. In some examples, when in the tablet configuration 304, the transparent display controller 200 may activate a touchscreen of the transparent display 110 of FIG. 4 (e.g., the touchscreen layer 120 of FIG. 1A).

Figure 4:
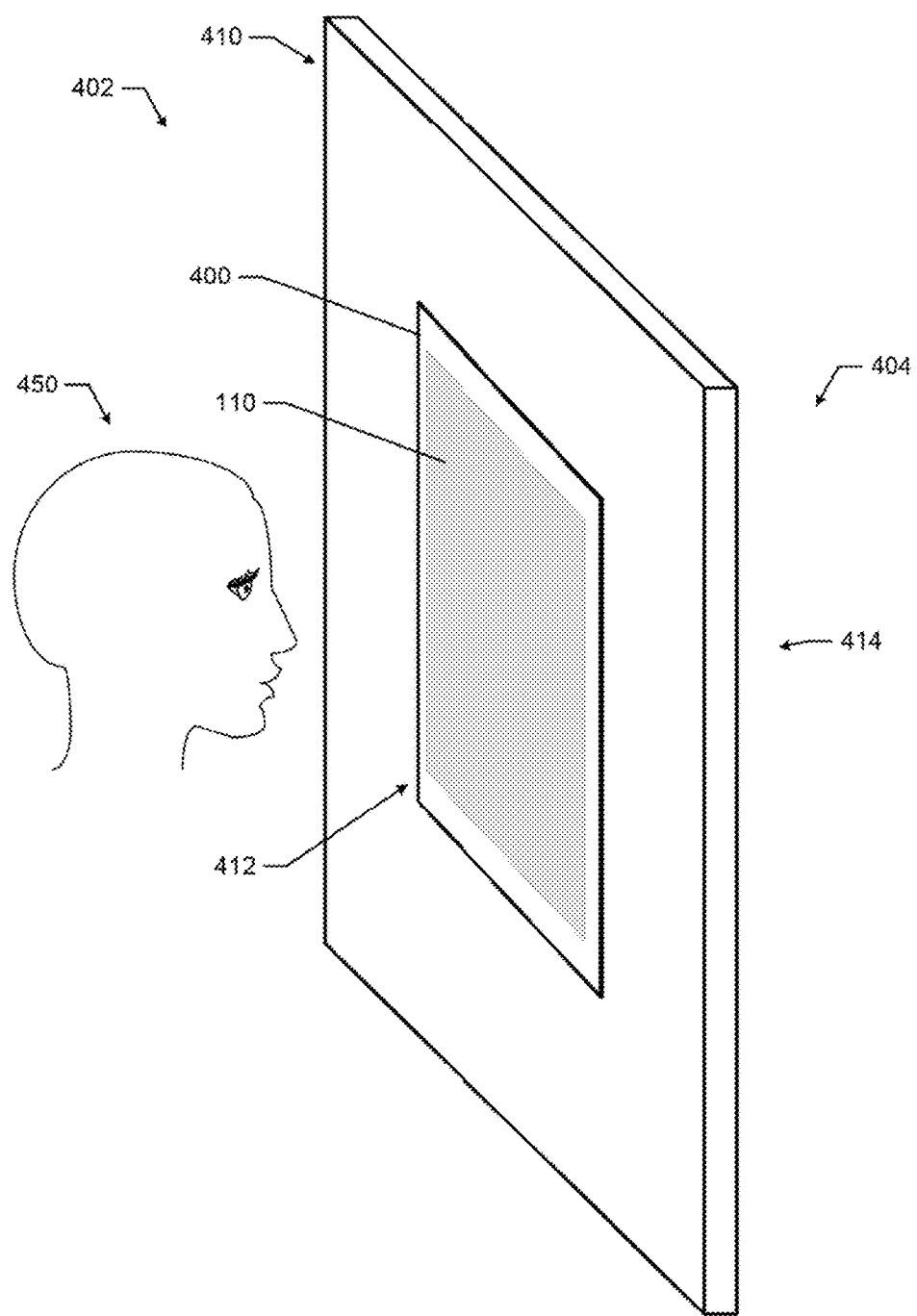
FIG. 4 illustrates an example implementation of use of the example transparent display of FIG. 1A or 1B on a wall.

FIG. 4 illustrates an example implementation of use of the example transparent display 110 of FIG. 1A on a wall 410. In FIG. 4, the wall 410 has a first side 402 and a second side 404. In FIG. 4, a user 450 is located on the first side 402 of the wall 410. In some examples, the user 450 may be located on the second side 404 of the wall 410, or the user 450 may not be located on either side of the wall 410 (i.e., there is no user 450).

In the illustrated example of FIG. 4, the transparent display 110 may be implemented by a display device 400 mounted on or within the wall 410. The example display device 400 may be in communication with a computing device (e.g., a personal computer, a tablet computer, a set top box, a gaming console, a server, etc.) to present a presentation from the computing device. The example communication may be wireless (e.g., Bluetooth™, Wi-Fi, etc.) or wired (e.g., high definition multi-media (HDMI), component cables, s-video, etc.).

In the illustrated example of FIG. 4, a user 450 is viewing the transparent display 110 on a first side 402 of the wall 410. Accordingly, a first side 412 (e.g., a front-side or user side) of the transparent display 110 presents a presentation to the user 450 using the display device 400. In FIG. 4, the characteristics analyzer 210 may determine that characteristics of the display device 400 indicate that the display device 400 is to present the presentation on the first side of the transparent display 110. For example, the characteristics analyzer 210 may determine which side 402, 404 of the wall 410 the user 450 is located to present a presentation on the transparent display 110 that can be viewed by the user 450. For example, the characteristics analyzer 210 may use a camera, image processing, facial recognition, sensors (e.g., movement sensors, depth sensors, light sensors, etc.) to determine the presence of the user 450 on the first side 402 of the wall 410. Additionally or alternatively, the characteristics analyzer 210 may determine that no user is on a second side 404 of the wall 410, and therefore, the presentation is to be presented on the first side 412 of the transparent display 110.

In some examples, the transparent display 110 may be set to a window setting (e.g., via instructions from a user or a transparent display controller) to allow the user to look through the transparent display 110 from the first side 402 of the wall to see the second side 404 of the wall 410 (or so that another user on the second side 404 of the wall 410 cannot see through the transparent display 110 to see the user 450 or the first side 402 of the wall 410). For example, the adjustable layer controller 220 may set adjustable transparency layers of the transparent display 110 (e.g., the adjustable transparency layers 130, 132) to a transparent setting and power off pixels of a transparent display (e.g., the transparent display 140) of the transparent display 110. In other examples, the transparent display 110 may be set to a privacy setting or wall setting by setting an adjustable layer (e.g., the first or second adjustable transparency layer 130, 132) to opaque so that the user 450 cannot see through the transparent display 110 to see the second side 404 of the wall (or so that another use on the second side 404 cannot see through the transparent display 110 to the first side of the wall 410).

Accordingly, in both FIGS. 3 and 4, a transparent display controller 220 (e.g., via the characteristics analyzer 210) may determine characteristics of the computing device 300 (e.g., a configuration of the computing device 300, a user presence, etc.) or the display device 400 to determine settings for presenting a presentation on a particular side of the transparent displays 110. For example, first settings of the transparent display 110 may be used to present a presentation for viewing on the first side of the transparent display 110 and second settings of the transparent display 110 may be used to present the presentation for viewing on the second side of the transparent display 110. The first settings may set a first adjustable transparency layer (e.g., the first adjustable transparency layer 130) to a transparent setting and a second adjustable transparency layer (e.g., the second adjustable transparency layer 132) to an opaque setting, and the second settings may set the first adjustable transparency to an opaque setting and the second adjustable transparency layer to a transparent settings.

Figure 5:
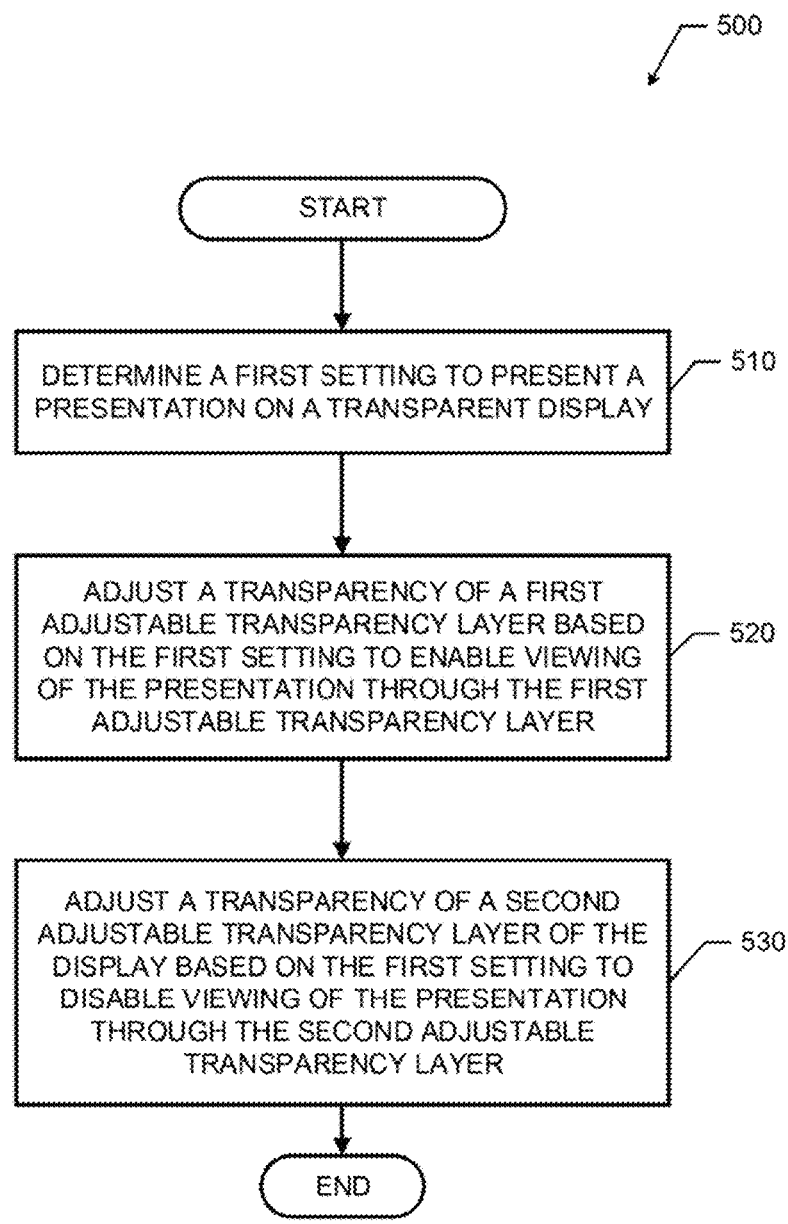
FIG. 5 is a flowchart representative of example machine readable instructions that may be executed to implement the transparent display controller of FIG. 2.
Figure 6:
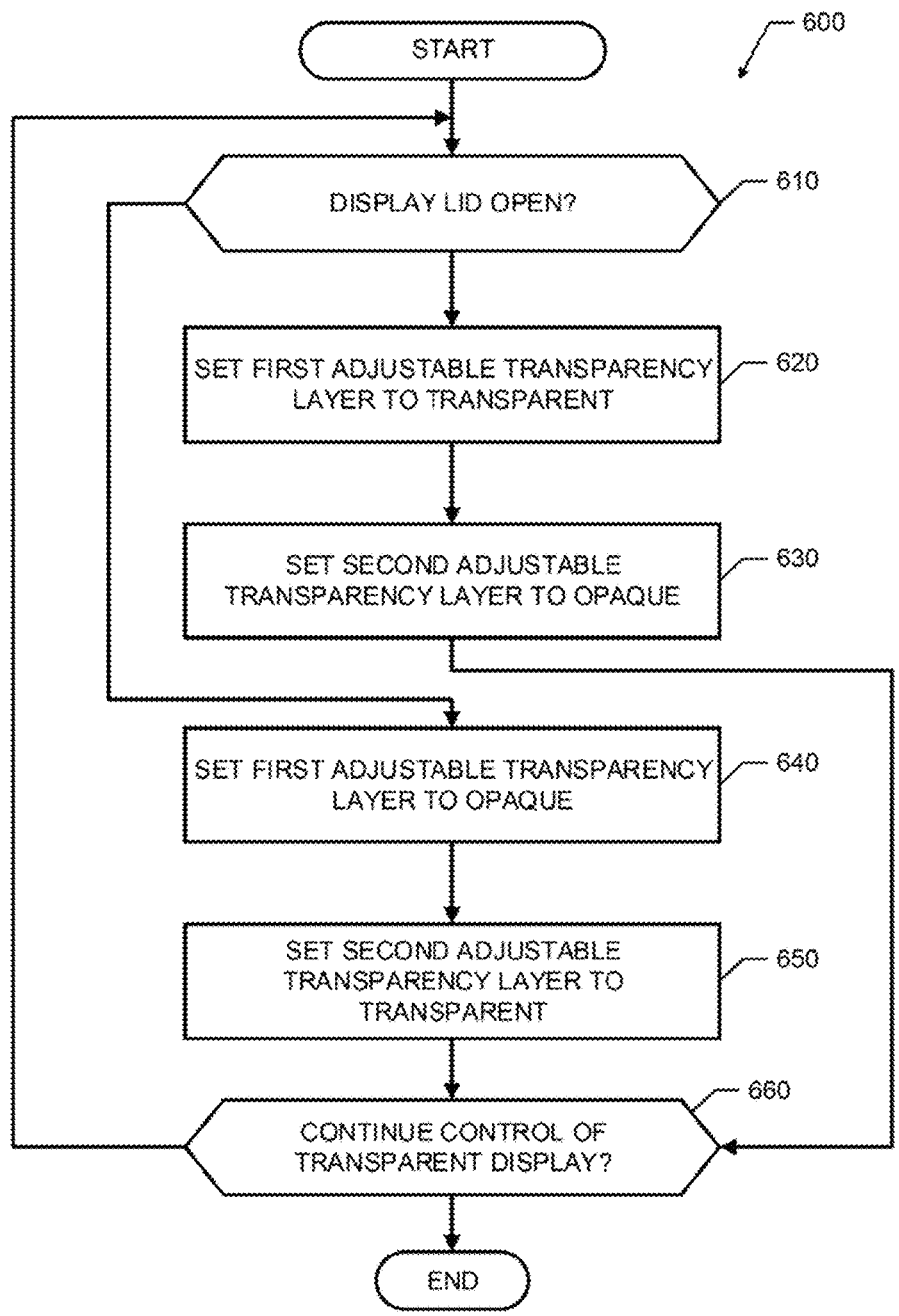
FIG. 6 is a flowchart representative of example machine readable instructions that may be executed to implement the transparent display controller of FIG. 2 to control a transparent display of a computing device.
Figure 7:
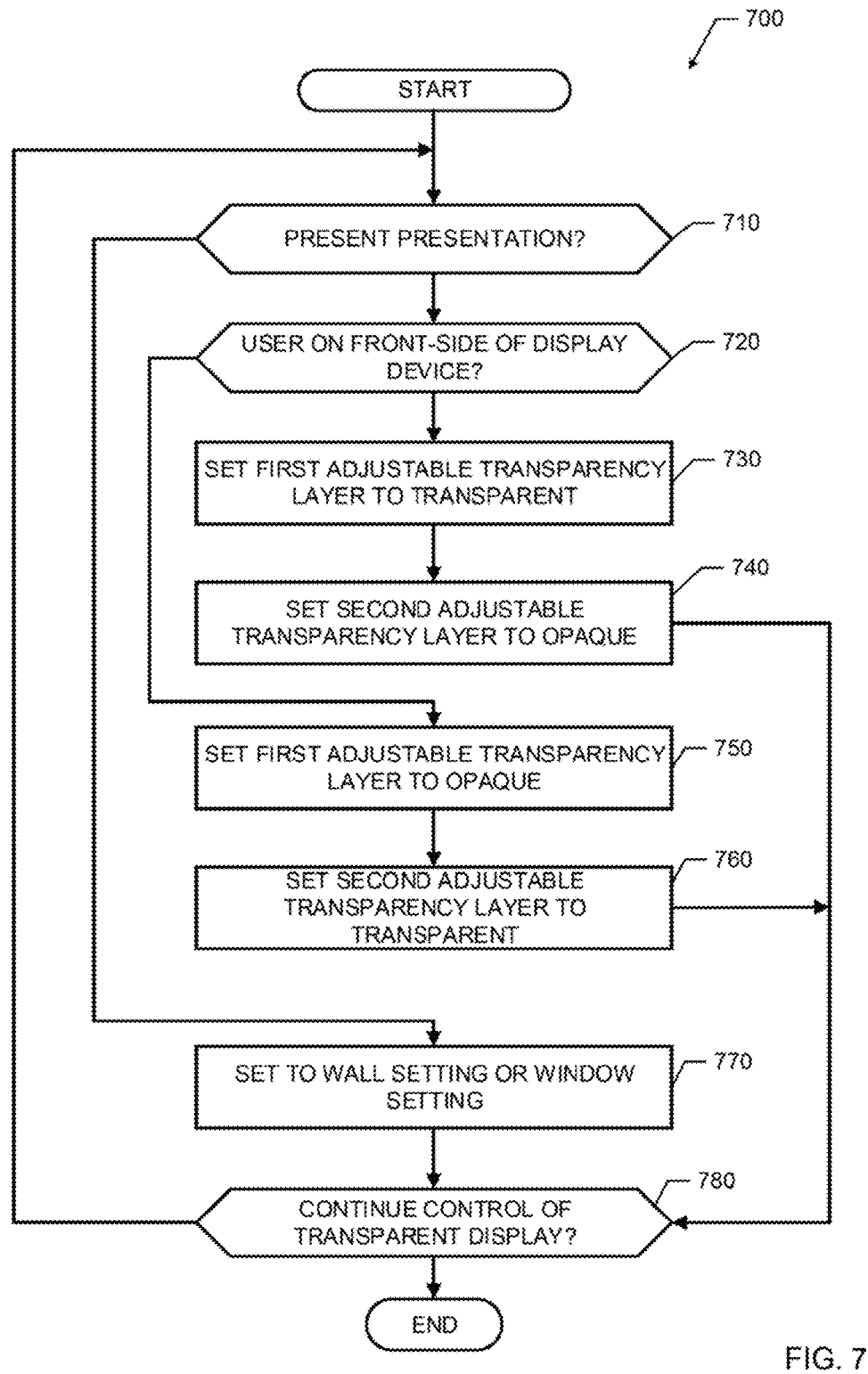
FIG. 7 is a flowchart representative of example machine readable instructions that may be executed to implement the transparent display controller of FIG. 2 to control a transparent display of a wall.

Flowcharts representative of example machine readable instructions for implementing the transparent display controller 200 of FIG. 2 are shown in FIG. 5, 6, or 7. In this example, the machine readable instructions comprise a program(s)/process(es) for execution by a machine. For example, such a machine may be a processor, such as the processor 812 shown in the example processor platform 800 discussed below in connection with FIG. 8. The program (s)/process(es) may be embodied in executable instructions (e.g., software) stored on a tangible computer readable storage medium such as a CD-ROM, a floppy disk, a hard drive, a digital versatile disk (DVD), a Blu-ray disk, or a memory associated with the processor 812, but part or all of the program(s)/process(es) may alternatively be executed by a device other than the processor 812 or embodied in firmware or dedicated hardware. Further, although the example program(s)/process(es) is/are described with reference to the flowcharts illustrated in FIG. 5, 6, or 7, many other methods of implementing the example transparent display controller 200 may alternatively be used. For example, the order of execution of the blocks may be changed, or some of the blocks described may be changed, eliminated, or combined.

The example process 500 of FIG. 5 begins with an initiation of the code transparent display controller 200 (e.g., upon startup, upon instructions from a user, upon startup of a device implementing the transparent display controller 200 (e.g., the transparent display device 100), etc.). The example process 500 of FIG. 5 may be executed to enable viewing on the transparent display 110 of FIG. 1A from either a front-side or a back-side of the transparent display 110.

At block 510 of FIG. 5, the characteristics analyzer 210 determines a first setting to present a presentation on the transparent display 110. For example, at block 510, the characteristics analyzer 210 may determine user settings or characteristics of the transparent display 110, characteristics of a device (e.g., a computer or a display device) associated with the transparent display 110, or characteristics of an environment of the transparent display 110. At block 520, the adjustable layer controller 220 adjusts a transparency of the first adjustable transparency layer 130 based on the first setting (e.g., a setting for viewing on the front-side of the transparent display device 100) to enable viewing of the presentation through the first adjustable transparency layer (e.g., by setting the first transparency layer to transparent). At block 530, the adjustable layer controller 220 adjusts a transparency of the second adjustable transparency layer of the display based on the first setting to disable viewing of the presentation through the second adjustable transparency layer (e.g., by setting the second transparency layer to opaque).

The example process 600 of FIG. 6 begins with an initiation of the transparent display controller 200 on a computing device (e.g., the computing device 300 of FIG. 3). The example process 600 of FIG. 6 may be executed to control the transparent display 110 implemented by a convertible computing device.

At block 610 of FIG. 6, the characteristics analyzer 210 determines whether a display lid is open (e.g., whether the computing device is in a laptop configuration). If the characteristics analyzer 210 determines that the display lid is not open, control advances to block 640. If, at block 610, the characteristics analyzer 210 determines that the display is open, the adjustable layer controller 220, at block 620, sets the first adjustable transparency layer 130 to transparent. For example, at block 620, the transparent first adjustable transparency layer 130 enables viewing from a front-side or laptop side of the computing device such that a user can see through the first adjustable transparency layer). At block 630, the adjustable layer controller 220 sets the second adjustable transparency layer 132 to opaque. For example, the opaque second adjustable transparency layer 132 may serve as a background for the presentation displayed on the transparent display layer 140 and prevent viewing from a back-side of the display lid (e.g., a tablet side). After block 630, control advances to block 660.

At block 640 of FIG. 6, the adjustable layer controller 220 sets the first adjustable transparency layer 130 to opaque. For example, at block 640, the opaque first adjustable transparency layer may serve as a background for a presentation on the transparent display layer 140 when the computing device is in a tablet configuration. At block 650, the adjustable layer controller 220 sets a second adjustable transparency layer 132 to transparent. For example, at block 650, the transparent second adjustable transparency layer may enable viewing of the transparent display layer 140 when the computing device is in the tablet configuration. In some examples, after block 650, the transparent display controller 200 may activate the touchscreen layer 120 of the transparent display 110 to facilitate user interaction with the computing device 300 in a tablet configuration.

At block 660, the transparent display controller 200 determines whether to continue control of the transparent display 110. If the transparent display controller 200 is to continue controlling the transparent display 110, control returns to block 610. If, at block 660, the transparent display controller 200 is not to continue controlling the transparent display (e.g., due to a failure, shutdown, etc.), then the example process 600 ends.

The example process 700 of FIG. 7 begins with an initiation of the transparent display controller 200 on a display device (e.g., the display device 400 of FIG. 4). The example process 700 of FIG. 7 may be executed to control the transparent display 110 implemented by a display device on a wall or mounted for viewing a multiple sides of the display device.

At block 710 of FIG. 7, the transparent display controller 200 determines whether to present a presentation on the transparent display 110. If the transparent display controller 200 determines that no presentation is to be presented on the transparent display 110, the control advances to block 770. If at block 710, the transparent display controller 200 determines that a presentation is to be presented on the transparent display 110 (e.g., in response to user instructions, instructions from computing device in communication with the display device, etc.), then, at block 720, the characteristics analyzer 210 determines whether a user is on a front-side of the display device. For example, at block 720, the characteristics analyzer 720 may retrieve, receive, or process images from a camera, measurement data from sensors, etc. to determine characteristics of an environment, such as user location or user presence relative to the transparent display. If the characteristics analyzer 210 determines that a user is on the front-side of the display (e.g., a default side of the transparent display), then the adjustable layer controller may set a first adjustable transparency layer 130 to transparent at block 730 and a second transparent layer to opaque at block 740 (e.g., similarly to blocks 620, 630, respectively, of FIG. 6). After block 740, control advances to block 780.

In the example process 700 of FIG. 7, if the characteristics analyzer 210 determines that there is not a user on the front-side of the display device at block 720 (e.g., because a user on is on the back-side, because there are currently no users detected by the characteristics analyzer 210, etc.), then the adjustable layer controller 220 sets the first adjustable transparency layer 130 to opaque at block 750 and the second adjustable transparency layer 132 to transparent at block 760 (e.g., similarly to blocks 640, 650, respectively, of FIG. 6). After block 760, control advances to block 780.

At block 770 of the example process 700 of FIG. 7, the adjustable layer controller sets the transparent display to a window or wall setting. For example, based on instructions from a user indicating a window setting, at block 770 the adjustable layer controller may set the first and second adjustable transparency layers 130, 132 to transparent for a window setting so that a user could look through the transparent display 110. As another example, based on instructions from the user to set the transparent display 110 to privacy, the adjustable layer controller 220 may set one or both of the adjustable transparency layers 130, 132 to opaque.

At block 780 of FIG. 7, the transparent display controller 200 determines whether to continue to control the transparent display 110. If the transparent display controller 200 is to continue controlling the transparent display 110, control returns to block 710. If, at block 780, the transparent display controller 200 is not to continue controlling the transparent display (e.g., due to a failure, shutdown, etc.), then the example process 700 ends.

As mentioned above, the example program(s)/process(es) of FIG. 5, 6, or 7 may be implemented using coded instructions (e.g., computer or machine readable instructions) stored on a tangible computer readable storage medium such as a hard disk drive, a flash memory, a read-only memory (ROM), a compact disk (CD), a digital versatile disk (DVD), a cache, a random-access memory (RAM) or any other storage device or storage disk in which information is stored for any duration (e.g., for extended time periods, permanently, for brief instances, for temporarily buffering, or for caching of the information). As used herein, the term tangible computer readable storage medium is expressly defined to include any type of computer readable storage device or storage disk and to exclude propagating signals and to exclude transmission media. As used herein, "tangible computer readable storage medium" and "tangible machine readable storage medium" are used interchangeably. Additionally or alternatively, the example processes of FIG. 5, 6, or 7 may be implemented using coded instructions (e.g., computer or machine readable instructions) stored on a non-transitory computer or machine readable medium such as a hard disk drive, a flash memory, a read-only memory, a compact disk, a digital versatile disk, a cache, a random-access memory or any other storage device or storage disk in which information is stored for any duration (e.g., for extended time periods, permanently, for brief instances, for temporarily buffering, or for caching of the information). As used herein, the term non-transitory computer readable medium is expressly defined to include any type of computer readable storage device or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 8:
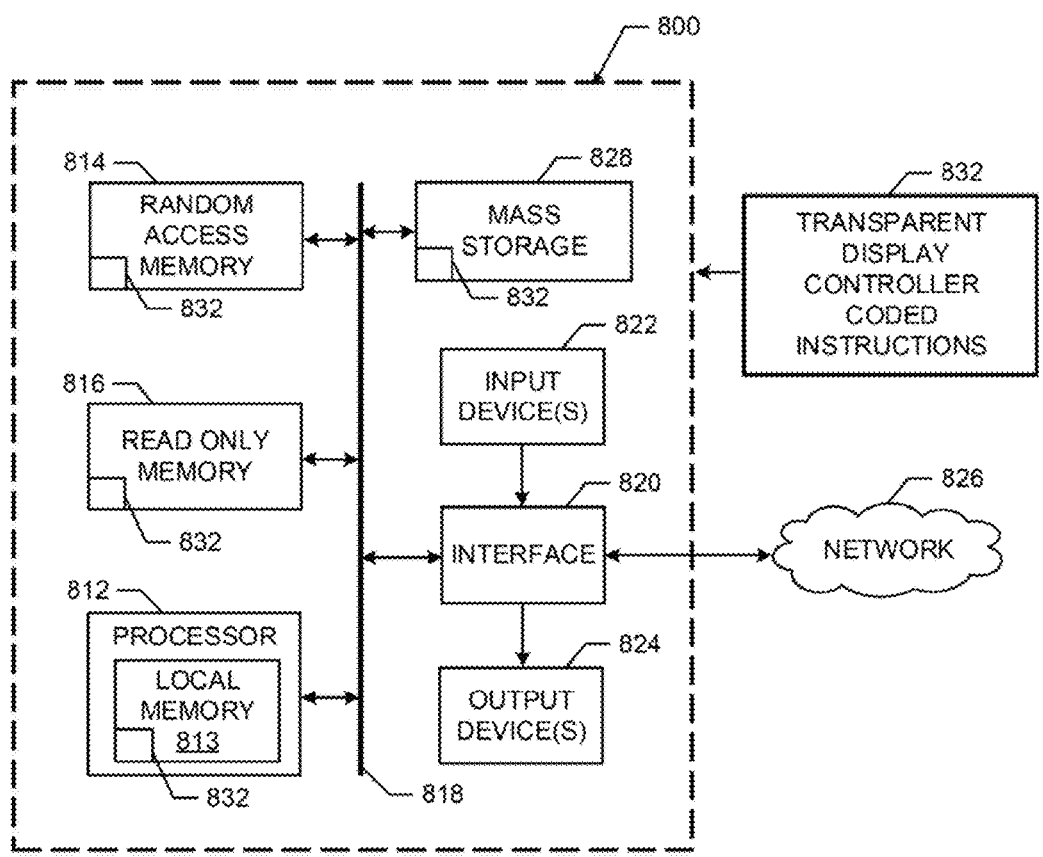
FIG. 8 is a block diagram of an example processor platform capable of executing the instructions of FIG. 5, 6, or 7 to implement the transparent display controller of FIG. 2.

FIG. 8 is a block diagram of an example processor platform 800 capable of executing the instructions of FIG. 5, 6, or 7 to implement the transparent display controller 200 of FIG. 2. The example processor platform 800 may be or may be included in any type of apparatus, such as a server, a personal computer, a mobile device (e.g., a cell phone, a smart phone, a tablet, etc.), a personal digital assistant (PDA), an Internet appliance, or any other type of computing device.

The processor platform 800 of the illustrated example of FIG. 8 includes a processor 812. The processor 812 of the illustrated example is hardware. For example, the processor 812 can be implemented by at least one integrated circuit, logic circuit, microprocessor or controller from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) or any other type of random access memory device. The non-volatile memory 816 may be implemented by flash memory or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), or a peripheral component interconnect (PCI) express interface.

In the illustrated example, at least one input device 822 is connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, or a voice recognition system.

At least one output device 824 is also connected to the interface circuit 820 of the illustrated example. The output device(s) 824 can be implemented, for example, by the transparent display device 100 or other display devices (e.g., a light emitting diode (LED), an organic light emitting diode (OLED), a liquid crystal display (LCD), a cathode ray tube display (CRT), a touchscreen, a tactile output device, a light emitting diode (LED), a printer or speakers). The interface circuit 820 of the illustrated example, thus, may include a graphics driver card, a graphics driver chip or a graphics driver processor.

The interface circuit 820 of the illustrated example also includes a communication device such as a transmitter, a receiver, a transceiver, a modem or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes at least one mass storage device 828 for storing executable instructions (e.g., software) or data. Examples of such mass storage device(s) 828 include floppy disk drives, hard drive disks, compact disk drives, Blu-ray disk drives, RAID systems, and digital versatile disk (DVD) drives.

The coded instructions 832 of FIG. 5, 6, or 7 may be stored in the mass storage device 828, in the local memory 813 in the volatile memory 814, in the non-volatile memory 816, or on a removable tangible computer readable storage medium such as a CD or DVD.

From the foregoing, it will be appreciated that the above disclosed methods, apparatus and articles of manufacture provide a transparent display including adjustable transparency layers and a transparent display layer. Examples disclosed herein allow for a single display to be used for viewing from multiple sides of a display device as well as control of the display based on characteristics of the display device or an environment of the display device. Adjusting transparency (or opacity) of the adjustable transparency layers may provide enhanced clarity or resolution of images presented on the transparent display.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A method comprising:
    determining a first setting to present a presentation on a transparent display layer of a display;
    adjusting a transparency of a first adjustable transparency layer of the display based on the first setting to present the presentation through the first adjustable transparency layer; and
    adjusting a transparency of a second adjustable transparency layer of the display based on the first setting to prevent the presentation from being presented through the second adjustable transparency layer.

2. The method as defined in claim 1, further comprising adjusting the presentation based on the first setting by at least one of reversing or inverting the presentation on the transparent display layer.

3. The method as defined in claim 1, wherein the first setting is determined based on a configuration of a device and the display.

4. The method as defined in claim 1, wherein the first setting is determined based on the presence of a user relative to the display.

5. The method as defined in claim 1, further comprising:
    determining a second setting to present the presentation on the transparent display;
    adjust the transparency of the first adjustable transparency layer of the display based on the second setting to prevent the presentation from being presented through the first adjustable transparency layer; and
    adjust the transparency of the second adjustable transparency layer of the display based on the second setting to present the presentation through the second adjustable transparency layer.

6. The method as defined in claim 1, wherein the transparent display layer of the display is between the first adjustable transparency layer of the display and the second adjustable transparency layer of the display.

7. A display comprising:
- a first adjustable transparency layer;
- a second adjustable transparency layer, the first adjustable transparency layer set to be transparent based on a first setting of the display and the second transparency layer set to be opaque based on the first setting of the display;
- a transparent display layer between the first adjustable transparency layer and the second adjustable transparency layer; and
- a display controller to render a presentation on the transparent display layer to facilitate presenting the presentation through the first transparency layer using the first setting.

8. The display as defined in claim 7, the display controller to change the first setting of the display to a second setting of the display, the first adjustable transparency layer set to be opaque based on the second setting and the second transparency layer set to be transparent based on the second setting, the transparent display layer to render the presentation to be presented through the second transparency layer using the second setting.

9. The display as defined in claim 8, the display controller to change the first setting to the second setting in response to identifying a change in characteristics of the display.

10. The display as defined in claim 8, the display controller to change the first setting to the second setting in response to identifying a user on the same side of the display as the second transparency layer.

11. The display as defined in claim 7, the transparent display layer comprising an array of transparent organic light emitting diodes.

12. The display as defined in claim 7, the first adjustable transparency layer and the second adjustable transparency layer comprising a suspended particle film, respectively, the suspended particle film to adjust between opaque and transparent based on a voltage applied to the suspended particle film.

13. A non-transitory machine readable storage medium comprising instructions that, when executed, cause a machine to at least:
- determine a first setting of a display comprising a first adjustable transparency layer, a second adjustable transparency layer, and a transparent display layer between the first adjustable transparency layer and the second adjustable transparency layer; and
- adjust a transparency of the first adjustable transparency layer and a transparency of the second adjustable transparency layer based on the first setting.

14. The non-transitory machine readable storage medium of claim 13, wherein the instructions, when executed, further cause the machine to:
- determine characteristics of the display; and
- determine the first setting in response to the characteristics.

15. The non-transitory machine readable storage medium of claim 13, wherein the instructions, when executed, further cause the machine to:
- render a presentation on the transparent display layer based on the transparency of the first adjustable transparency layer and the transparency of the second adjustable transparency layer.

* * * * *